US011704725B1

(12) United States Patent
Fitzgerald et al.

(10) Patent No.: US 11,704,725 B1
(45) Date of Patent: *Jul. 18, 2023

(54) METHOD, MEDIUM, AND SYSTEM TO OPTIMIZE REVENUE USING A BID RESERVATION SYSTEM

(71) Applicant: GolfLine, Inc., Indialantic, FL (US)

(72) Inventors: Sean Fitzgerald, Indialantic, FL (US); Martin Dougherty, Melbourne, FL (US); Brendan Fitzgerald, Indialantic, FL (US)

(73) Assignee: GOLFLINE, INC., Indialantic, FL (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/036,653

(22) Filed: Sep. 29, 2020

Related U.S. Application Data

(63) Continuation of application No. 16/017,577, filed on Jun. 25, 2018, now Pat. No. 10,825,084.

(60) Provisional application No. 62/523,837, filed on Jun. 23, 2017.

(51) Int. Cl.
*G06Q 30/00* (2023.01)
*G06Q 30/08* (2012.01)
*G06Q 10/02* (2012.01)
*G06N 20/00* (2019.01)

(52) U.S. Cl.
CPC ............ *G06Q 30/08* (2013.01); *G06N 20/00* (2019.01); *G06Q 10/02* (2013.01)

(58) Field of Classification Search
CPC ......... G06Q 30/08; G06Q 10/02; G06N 20/00
See application file for complete search history.

(56) References Cited

U.S. PATENT DOCUMENTS

| | | | | |
|---|---|---|---|---|
| 6,553,346 | B1* | 4/2003 | Walker | G06Q 20/02 705/25 |
| 6,993,503 | B1* | 1/2006 | Heissenbuttel | G06Q 40/00 705/28 |
| 7,103,580 | B1* | 9/2006 | Batachia | G06Q 40/00 705/37 |
| 7,346,520 | B2* | 3/2008 | Etzioni | G06Q 10/06 705/400 |
| 2017/0046624 | A1* | 2/2017 | Murdock, IV | G09B 7/02 |
| 2017/0103437 | A1* | 4/2017 | Guillard | G06Q 10/087 |

(Continued)

OTHER PUBLICATIONS

Oliver, Jim R. "A machine-learning approach to automated negotiation and prospects for electronic commerce." Journal of management information systems 13.3 (1996): 83-112. (Year: 1996).*

*Primary Examiner* — Matthew E Zimmerman
(74) *Attorney, Agent, or Firm* — John L. Deangelis; Wolter, Van Dyke, Davis, PLLC (57) ABSTRACT

A method for evaluating bids for the purchase of inventory items to optimize bid-generated revenue. The method comprises receiving a bid for an inventory item, the bid comprising a bid price, a specific inventory item that is to be purchased, and a number of inventory items to be purchased. The bid is input into a machine learning algorithm as are features associated with the inventory item and information associated with the bid. The machine learning algorithm analyzes the bid and generates an output to accept or decline the bid. Responsive to that output the bidder is advised whether the bid was accepted or declined.

16 Claims, 4 Drawing Sheets

(56) References Cited

U.S. PATENT DOCUMENTS

2017/0161767 A1* 6/2017 Mead ................. G06Q 30/0633
2017/0287038 A1* 10/2017 Krasadakis ........ G06Q 30/0201
2018/0268475 A1* 9/2018 Ziskin .................... G06Q 30/08

* cited by examiner

METHOD, MEDIUM, AND SYSTEM TO OPTIMIZE REVENUE USING A BID RESERVATION SYSTEM

CROSS REFERENCE TO RELATED APPLICATION

The present application is a continuation of the non-provisional application assigned Ser. No. 16/017,577, filed on Jun. 25, 2018, now U.S. Pat. No. 10,825,084, which claims priority to the provisional patent application assigned number 62/523,837, filed on Jun. 23, 2017, which are incorporated herein in their entirety.

FIELD OF THE INVENTION

The invention generally relates to a method that allows businesses to optimize or maximize the revenue and profit generated from the sale of products or services, i.e. the sale of "inventory" when demand for the inventory is uncertain. The invention uses machine learning algorithms to evaluate bids (also referred to as offers) submitted by prospective customers to purchase the inventory and accept or reject each bid on a standalone basis, i.e. not in comparison with other bids. The invention is especially useful for businesses that sell products or services that are perishable and capacity constrained, as these businesses have the greatest incentive to sell additional inventory in a time-efficient manner to optimize revenue. The invention helps these businesses to make the difficult decisions over which bids to accept and which to reject given these time and capacity constraints. The invention also addresses the need many businesses have to provide a near real-time response to the bidder.

BACKGROUND OF THE INVENTION

Many businesses sell products or services that are both perishable and capacity constrained. Products or services are perishable if they are available for only a limited time period and after that time has passed they are not available or saleable (see examples set forth below). Products or services are capacity constrained (i.e. scarce resources) if factors associated with the product or service offered for purchase limit the amount of inventory available for sale (see examples below). Examples include but are certainly not limited to:

Airlines-that sell the right to occupy one of a finite number of seats on a flight. If the flight takes off with empty seats, the unsold "seat inventory" perishes and has no value;

Hotels-that sell the right to stay in one of a finite number of available rooms for a night.

If a room is empty on any given night, there is no way to recover the lost revenue; and Golf courses-that sell tee times (i.e. the right to play the course at a given time), which are limited by the amount of available daylight and the need for spacing between groups of golfers. If no one tees off at a given tee time, the inventory is lost forever.

All businesses incur costs associated with the inventory they sell. These costs are typically categorized as either: (i) fixed costs, i.e. costs that are incurred irrespective of the amount of inventory available for sale; and (ii) variable costs, which are directly proportional to the amount of inventory. For example, while the fixed cost to fly a plane from New York to Los Angeles is significant (e.g. fuel, crew salaries, and other costs that don't vary materially with the number of passengers), the variable cost associated with each incremental passenger is minimal (perhaps only the snacks and drinks given to the extra passenger). In other cases, products or services may have higher variable costs. For example, a manufacturer of automobiles must purchase a significant amount of raw materials to manufacture each unit of inventory.

For many businesses, customer demand for inventory can vary dramatically depending on many exogenous factors. Sometimes flights are fully booked (or utilized), other times a flight between the same two cities at the same time on a different day is empty. Sometimes hotels are overbooked, the next week the same hotel is offering deep discounts to try to attract guests. Sometimes golf courses are crowded, while the next week your group might be one of the few on the course.

As is widely known by people who are skilled in the art, the goal of any business is to sell its inventory at a price that exceeds the variable cost. The excess amount, commonly called contribution margin, can be used to offset the business's fixed costs and also generate a profit if the total contribution margin generated from the sale of all inventory exceeds the business's fixed costs.

From the above information, it should be clear that many businesses could benefit from using a system that allows customers to offer a price they are willing to pay, rather than allowing inventory to go unsold because the potential customer was unwilling to pay the list or "asking" price. If the inventory that customers are bidding on is not capacity constrained, it is simple to decide which bids to accept. Any bid that exceeds the inventory's variable cost should be accepted because it will generate positive contribution margin and help offset fixed costs. However, if the inventory is capacity constrained, the challenge of deciding which bids to accept and reject becomes much more challenging, because the business will now want to sell the limited available inventory to the highest bidder(s) in order to maximize its revenue.

The impact of capacity constraints would be significantly minimized if all bids could be aggregated and evaluated simultaneously, e.g., a business that gets ten bids for the five units of inventory it is selling can look at all ten bids and select the five highest offers. When this is not possible, and each bid needs to be evaluated on its own merit without the benefit of knowing the number and value of other bids that will be submitted later, it creates an extremely complex problem of deciding which bids to accept and which bids to reject as the bids are submitted or shortly thereafter. Maximizing the revenue generated from the bids in this latter scenario requires an ability to accurately forecast the amount of inventory that will be available, the number of future bids and the prices that will be offered in future bids.

This already complex problem is exacerbated in cases where inventory is perishable, such as a seat on an airplane that has no value after the flight has departed. The element of perishability adds a time constraint to the problem, as the future inventory and bid forecast described in the preceding paragraph now has to resolve in a timeframe that allows the inventory to be utilized before it perishes, (i.e., is no longer available).

A similar challenge arises as a result of the real-world nature of customers. Many customers are accustomed to the "immediate gratification" that permeates many elements of today's society. Thus, they need a near real-time response that their bid/offer is accepted or they will take their business somewhere else to avoid the risk of not being able to make the purchase.

BRIEF DESCRIPTION OF THE FIGURES

The following sections will be better understood when read in conjunction with the appended drawings. For the purpose of illustrating the invention, there are shown in the drawings exemplary embodiments of the invention; however, the invention is not limited to the specific methods, compositions, and devices disclosed. In the drawings.

DETAILED DESCRIPTION OF THE INVENTION

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination. Further, references to values within a stated range include each and every value within that range.

The disclosures of each patent, patent application, and publication cited or described in this document is incorporated herein by reference in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the spirit and scope of the invention.

The present invention is a system and method to help businesses optimize their revenue by evaluating bids or offers for their inventory, in near real-time, to determine whether each prospective customer's bid should be accepted or rejected without the necessity of comparing it against other bids. The invention utilizes a machine learning algorithm that is trained to make the accept/reject determination. The trained machine learning algorithm provides a correct decision (i.e., a decision that generates greater revenue for the business) much more frequently than would other decision-making techniques.

While the general use of machine learning algorithms and associated training and updating techniques are well known to those skilled in the art, their use to evaluate bids for perishable inventory that is capacity constrained, in near real time, is novel and non-obvious. In the context of machine learning algorithms, "training" usually refers to the learning process that is conducted prior to placing the machine learning algorithm in operation; whereas "updating" refers to learning processes that are performed after the algorithm has become operational.

Machine Learning Algorithms

Machine learning algorithms are dynamic models, implemented in software, that assimilate vast amounts of input data to generate outputs that are typically either classification, i.e., binary decisions (e.g. yes/no, accept/reject, etc.) or numeric predictions (e.g. 97%). Machine learning algorithms are differentiated from static computational algorithms by their ability to independently change (i.e., learn) the way the outputs are determined, with minimal human intervention. Machine learning algorithms are programmed to self-adjust to reduce the error of subsequent output predictions to better match an actual or desired outcome. Over time, and many iterations, these algorithms learn to make accurate predictions within the bounds of given constraints.

Machine learning is a broad umbrella term that covers many different algorithms that each utilize different design strategies. Sub-categories of machine learning algorithms include artificial neural networks, decision trees, random forests, support vector regression and many more. Many of these algorithms are best suited for specific classes of problems. For instance, decision trees are excellent at binary or multiple classification problems, while support vector regression is better for continuous value prediction problems.

The choice of an algorithm is determined by the type of data input to the model and the type of prediction output desired. One skilled in the art of machine learning will know how to select the appropriate algorithm to implement the subject invention in different business situations. Further, such an individual will know how to select and install the proper software tools to implement the selected algorithm from among any number of generally available machine learning algorithm development libraries such as Tensor-Flow (available from Google, Inc. of Mountain View, Calif.), Theano (developed by the Université de Montréal), Sci-kit learn (Scikit-learn: Machine Learning in Python, Pedregosa et al., JMLR 12, pp. 2825-2830, 2011), or CNTK (available from Microsoft Corporation of Redmond, Wash.).

Figure 1:
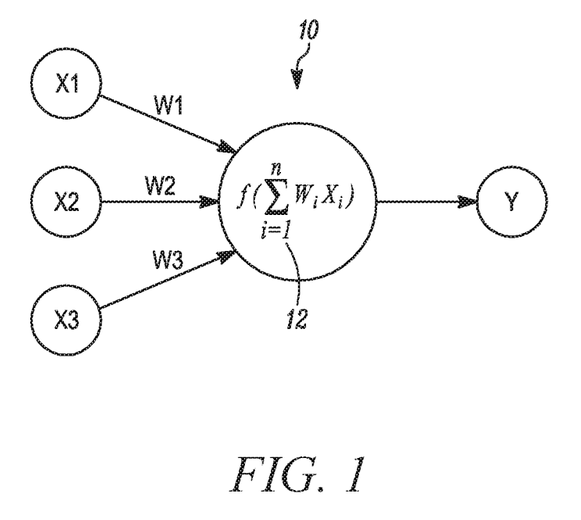
FIG. 1 illustrates a single neuron in an artificial neural network, including inputs, weights, their combination, and output.

One implementation of the subject invention involves the use of an artificial neural network. Artificial neural networks are collections of "neurons" that are configured in one or more "layers". FIG. 1 depicts a single neuron in an artificial neural network. A single neuron 10 embodies a mathematical activation function 12, i.e., a simple static function that converts multiple weighted inputs to a single output value. The neuron 10 receives input data from an unlimited number of sources (X1, X2, X3 in FIG. 1), applies a weight value to each input (weights W1, W2, W3 in FIG. 1), sums the weighted values, and applies the activation function 12 to the sum to predict an output (shown as Y in FIG. 1).

The specific activation function used in a neural network depends on the type of output desired. Activation functions can be as simple or complex as necessary to adequately represent the combined effect of the lower layer of the network or the combination of the input data. For instance, predicting a binary classification suggests use of a sigmoidal activation function that outputs a 0 or 1. Outputs greater than a threshold (usually 0.5) are predicted to be one category (e.g. acceptable bids) while outputs below a threshold fall into the other category (e.g. rejected bids).

Regardless of the activation function, the calculated output (Y) can then be passed to another neuron as an input, or it can represent the final output of the complete neural network. One skilled at implementing artificial neural networks can apply the appropriate activation function as determined by the types of inputs and the desired output.

Figure 2:
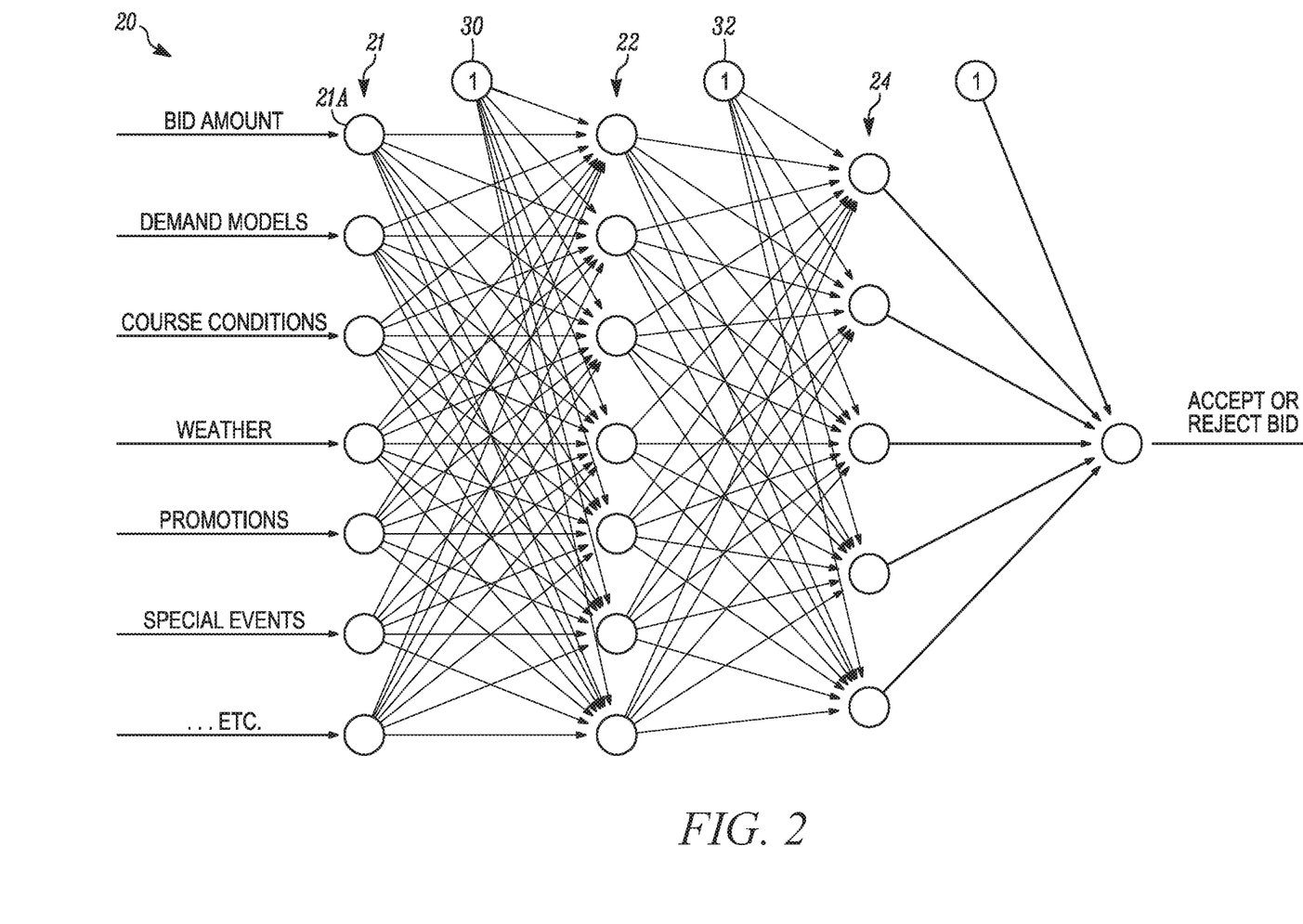
FIG. 2 illustrates an exemplary artificial neural network that implements the present invention.

FIG. 2 is a schematic diagram of a very simple artificial neural network used to make accept or reject decisions for bids on golf tee times, as one non-limiting example. A plurality of input features is shown on the left side of FIG. 2, each input establishing a value that is input to each node in a column 21.

Each input feature or variable is represented numerically through normalization, scaling, or one-hot encoding. For example, when using one-hot encoding, a single category (i.e. colors) is coded into a series of binary representations for each type represented in that the category where only one column has a 1 corresponding to the appropriate category (only the "green" column has a 1, while all other colors are marked with a 0). Scaling and normalization are used to represent numerical data in a similar fashion to the algorithm. For example, rather than inputting the actual bid amount, the input can be the actual bid amount as a percent of the typical sale price. The granularity of the inputs can also vary. For example, an advertising promotion is typically offered for the entire day (or several consecutive days) and thus the input value to the neural network does not change during the day. However, the weather can vary from hour-to-hour and different input values can be supplied on an hourly basis to represent weather variations. Alternatively, the user may decide to use a simple weather forecast for the entire day. Another example of varying granularity is that overall weather conditions could be a single input, or there could be separate inputs for expected temperature, expected windspeed, chance of precipitation, etc.

As the output values from each node in column 21 are passed to one or more nodes in column 22 they are modified by weights, as indicated by the numbers adjacent to the lines that show the connections between nodes. For example, several lines extend from the node 21A to each node in column 22. As can be seen, the weight values adjacent to each output line are different. The weight values modify the output value from the node 21A and the weighted value is input to the corresponding node in the column 22. The process is repeated with various weights multiplied by the output value from each node in column 22; the weighted value is then input to each one of the nodes in a column 24.

As a general statement, the weight values in FIG. 2 indicate the effect that an input feature or variable has on each node in the next column. Note that the effect is likely different for each node in the subsequent column as reflected by different weight values. Further note that the weight could be zero if the input feature has no effect on the next node.

Nodes 30 and 32 represent bias values for each node in columns 22 and 24. These bias values may be based on results from prior iterations through the neural network 20 and thus establish a starting point (or constant adjustment) for the input value in each node. The bias values are not necessarily changed for each learning iteration through the neural network 20. Instead, when the algorithm is trained or updated, the weight values are changed to optimize the outcome from the neural network so that, in the context of the golf tee time application for example, the golf course revenue is optimized.

As shown in FIG. 2, an artificial neural network typically entails a complex amalgamation of individual neurons with different weights (applied to the output of each neuron), diverse input data, and a plurality of activation functions to accurately predict an outcome. However, even the simplest machine learning algorithms are capable of iteratively updating the weights of the input data. This is key to the present invention. To train or update the network (i.e., adjust the weight values), the network output is compared with an optimal or desired output. Prediction error is defined as the difference between the network output and the desired output. A loss function computes the magnitude and direction of the prediction error. The prediction error is then back-propagated through the network, updating the weight values or parameters for each neuron to reduce prediction errors in subsequent iterations. Thus, the neural network is not a static function or network, but one that changes with each training episode.

For situations in which inventory is capacity constrained or scarce (for example, one airplane flight with a finite number of seats) and the goal is to optimize revenue, linear programming or other similar mathematical optimization techniques such as Markov Chain Monte Carlo estimation, can be used on a post-hoc basis to find the ideal or near-ideal subset of bids that should have been accepted in order to maximize the revenue generated from a given set of bids for the scarce inventory.

Accumulated data from the optimization of multiple sets of bids over different inventory items results in a body of historical data useful for training a machine learning algorithm on the features associated with optimal bids.

In one scenario, the initial weights may be randomly selected. Training is then conducted using historical data until the weights converge to values that work fairly well for matching input data with the correct output data. The weight values can then be tested using additional historical data. Finally, in the context of maximizing revenue based on bids, the machine learning algorithm predicts whether a bid should be accepted or declined. Training of the algorithm can continue even after it has been put to use by the optimization and back-propagation techniques described herein (which is generally referred to as updating the algorithm).

A network trained with many observations of historical data can achieve robust and accurate predictive capabilities. Once a network has learned a stable pattern of prediction, it can be deployed to make real time predictions. Unlike training, which can take a significant amount of time or computing power, feed-forward prediction (i.e. evaluating a single bid) is very quick and allows the algorithm to administer decisions in near real time. Furthermore, training (generally referred to as updating the algorithm once the algorithm has been deployed in operation) can be continued given new data even after the algorithm is operational and can be further enhanced when used in conjunction with reinforcement learning techniques to optimize learning to increase a target goal (such as revenue).

EXAMPLE IMPLEMENTATION OF THE INVENTION FOR RESERVING GOLF COURSE TEE TIMES

Golf courses sell tee time reservations whereby golfers reserve a specific time at which they can begin their round of golf. Each golf course is capacity constrained in that:
- each tee time has only 4 slots, i.e., it can accommodate no more than 4 golfers;
- there are typically 7-8 tee times available per hour, to allow sufficient spacing between groups of golfers; and
- tee times cannot commence until shortly after sunrise and typically end well before sunset as golf cannot be played in the dark.

Further, tee times are perishable. As can be easily appreciated, it is not possible to generate revenue from a tee time that passes unused. Demand from golfers is both highly perishable and stochastic. Additionally, golfers cannot wait until the night before a tee time to know whether their bid was accepted, as they would typically need to make alternative plans if their bid was declined. Thus, golf courses do not have the luxury of aggregating numerous bids until a short time prior to the scheduled tee time, comparing the bids to determine which bids to accept and decline, and then informing golfers at the last minute if they have been chosen to play.

Finally, virtually all of the costs incurred by golf courses are fixed costs (e.g. property taxes, maintenance costs, irrigation costs, etc.) that do not change irrespective of the number of golfers using the course. Also, the variable costs associated with having one more golfer on a course are miniscule. Therefore, almost all bids will provide positive contribution margin. Golf courses are thus a perfect example of a type of business that can benefit significantly from using the subject invention.

Consider a golf course that accepts tee time reservations seven days in advance. Assume the course's list price for a Sunday morning tee time is $50 per golfer and a potential customer calls on the Tuesday prior and offers to pay $40 to play on Sunday morning. The decision to accept or reject the $40 offer depends on whether there are any available tee time slots remaining for Sunday morning, and if so, the likelihood of having all of the slots filled (as of Sunday morning) by golfers who have paid more than $40 to play.

If the course expects to be at full capacity with customers who are willing to pay the $50 list price, or the course expects subsequent bidders to offer more than $40 later in the week, the bid should be declined. Conversely, if when Sunday morning arrives there are unused slots, or some slots were sold to golfers who paid less than $40, it would have benefited the course to accept the $40 bid.

This example clearly illustrates that the challenge of maximizing golf course revenue is one of accurately predicting market demand in terms of both the number of customers and their willingness to pay. Unfortunately, the demand for tee times is highly stochastic and dependent on numerous factors that have varying levels of correlation. The factors include, but certainly are not limited to: the weather; course conditions; competing course conditions and promotions; competing events (e.g., the local football team has game); time of the year and day of the week. Other factors that would be useful to evaluate when making the decision of whether or not to accept the example bid include: the current and historical utilization of Sunday tee times, the historical number of bids and the dollar amount each bid that are typically received to play on Sundays, the amount of the current bid, and many others known to those skilled in the art.

To apply the subject invention to this problem, bids are obtained from customers who desire to purchase a tee time reservation. Certain data specific to each bid, i.e. the number of golfers desiring to play, the number of holes they want to play and the amount they are willing to pay are provided as one of many inputs in the first layer of an artificial neural network. As depicted in FIG. 2, additional inputs to the first layer of an artificial neural network include:
- Bid Amount: representative of the total dollar value of the bid to be analyzed.
- Demand Model(s): representative of the historical demand for the day of play (e.g. the average demand on Sundays over the last X Sundays).
- Course Conditions: representative of the expected course conditions on the day of play.
- Weather: representative of the expected weather conditions on the day of play.
- Promotions: representative of available promotions (e.g., discounts) for the day of play (as the availability of promotions would be expected to increase demand).
- Special Events: representative of special events at the golf course or in the surrounding region that may affect a person's decision to play golf on that day.
- Etc.: This category is intended to capture other categories of inputs that may encourage or discourage a golfer from playing a round of golf and thus should be considered by the algorithm.

Those skilled in the art recognize and as described above, each input is represented numerically and scaled or weighted appropriately as the inputs propagate through the neural network. Typically, these inputs pertain to a specific golf course and thus serve to customize the algorithm for an individual course.

Each offered bid is evaluated individually based on the bid amount (the uppermost input to the network 20) along with the other input factors associated with the bid (e.g., special events that are occurring concurrently with the desired tee time). In this example, the network generates an output value that translates to a binary decision to accept or decline this bid.

The network is trained or updated, as described herein, by a post hoc review of the course utilization and course revenue based on the bids that were accepted and rejected. The pertinent goal during this review and training process is to determine which rejected bids (if any) should have been accepted to increase course revenue and which accepted bids (if any) should have been rejected in favor of more valuable bids that were made later in the week. In the training process the weights are modified to make better predictions as to which rejected bids should have been accepted and which accepted bids should have been rejected.

Training the network to optimize revenue requires an understanding of certain additional characteristics of golf courses. A group of four golfers (a "foursome") can make a reservation together, or smaller groups (i.e. 1-3 golfers) can make reservations. Smaller groups can optionally be aggregated into larger groups at the course. For example, two groups of two players (i.e., two "twosomes") can be combined into a foursome, as could a threesome and a single player, or four singles. For clarity, larger groups cannot normally be disaggregated at the course, i.e. a foursome cannot be broken up into two twosomes.

Armed with these playing group constraints, as well as the benefit of 20/20 hindsight regarding both the actual utilization of tee times and the bids received to play at those tee times, which can be gained only after the tee times have passed, it is possible to mathematically identify which bids should have been accepted and rejected in order to optimize the revenue generated on any given day (which likely does not equate with the bids that were actually accepted and rejected). Once the ideal bids are identified, the machine learning algorithm is updated, i.e., the weights are changed, so that the optimal result (that is, maximum revenue) would be achieved for the same bids with the same exogenous features. Now that the algorithm has been updated, when it is employed to evaluate bids on subsequent inventory, it will produce a result (accepting certain bids and rejecting certain bids) that will be closer to optimal revenue.

Consider the following simplistic example. Assume a golf course receives ten bids to play golf anytime between 9:00 AM and 10:00 AM on a given Sunday morning with the individual bid characteristics shown in Table 1.

TABLE 1

Summary of Bids Received

| | Bid #: | | | | | | | | | |
|---|---|---|---|---|---|---|---|---|---|---|
| | 1 | 2 | 3 | 4 | 5 | 6 | 7 | 8 | 9 | 10 |
| # of Players: | 1 | 2 | 2 | 2 | 2 | 4 | 3 | 3 | 2 | 2 |
| Total Bid Value: | $76 | $65 | $74 | $70 | $63 | $65 | $68 | $82 | $73 | $72 |

Further assume that based on a post-hoc review of the course's records, Table 2 represents the actual course utilization during the period from 9:00-10:00 AM on the Sunday of interest based only on sales of inventory through channels other than the bidding process, i.e. it includes only golfers who purchased a tee time reservation at the list price.

TABLE 2

Course Utilization from Non-Bidding Golfers

| Tee Time | Paid Players | Openings |
|---|---|---|
| 9:00 | 1 | 3 |
| 9:08 | 2 | 2 |
| 9:16 | 3 | 1 |
| 9:24 | 1 | 3 |
| 9:32 | 2 | 2 |
| 9:40 | 0 | 4 |

TABLE 2-continued

Course Utilization from Non-Bidding Golfers

| Tee Time | Paid Players | Openings |
|---|---|---|
| 9:48 | 2 | 2 |
| 9:56 | 3 | 1 |

Optimization techniques have been previously developed to solve similar problems (often referred to as knapsack or packing problems) and one skilled in mathematical optimization will be familiar with these techniques. Linear algebra optimization is one such technique, whereby a solution can be deduced by setting an array of bids into a given set of tee sheet constraints and maximizing the revenue. Thus, using linear algebra optimization or another mathematical optimization technique, it can be determined that the ideal (or near-ideal in the case of multiple approximate solutions) combination of bids that should have been accepted is shown in Table 3.

TABLE 3

Optimal Bid Combination

| | | | Bid #: | | | | | | | | | |
|---|---|---|---|---|---|---|---|---|---|---|---|---|
| | | | 1 | 2 | 3 | 4 | 5 | 6 | 7 | 8 | 9 | 10 |
| | | | # of Players: | | | | | | | | | |
| | | | 1 | 2 | 2 | 2 | 2 | 4 | 3 | 3 | 2 | 2 |
| | | | Total Bid Value: | | | | | | | | | |
| Tee Time | Paid Players | Openings | $76 | $65 | $74 | $70 | $63 | $65 | $68 | $82 | $73 | $72 |
| 9.00 | 1 | 3 | 0 | 0 | 0 | 0 | 0 | 0 | 0 | 1 | 0 | 0 |
| 9.08 | 2 | 2 | 0 | 0 | 1 | 0 | 0 | 0 | 0 | 0 | 0 | 0 |
| 9.16 | 3 | 1 | 0 | 0 | 0 | 0 | 0 | 0 | 0 | 0 | 0 | 0 |
| 9.24 | 1 | 3 | 0 | 0 | 0 | 0 | 0 | 0 | 1 | 0 | 0 | 0 |
| 9.32 | 2 | 2 | 0 | 0 | 0 | 1 | 0 | 0 | 0 | 0 | 0 | 0 |

TABLE 3-continued

Optimal Bid Combination

| | | | Bid #: | | | | | | | | | |
|---|---|---|---|---|---|---|---|---|---|---|---|---|
| | | | 1 | 2 | 3 | 4 | 5 | 6 | 7 | 8 | 9 | 10 |
| | | | # of Players: | | | | | | | | | |
| | | | 1 | 2 | 2 | 2 | 2 | 4 | 3 | 3 | 2 | 2 |
| | | | Total Bid Value: | | | | | | | | | |
| Tee Time | Paid Players | Openings | $76 | $65 | $74 | $70 | $63 | $65 | $68 | $82 | $73 | $72 |
| 9.40 | 0 | 4 | 0 | [1] | 0 | 0 | 0 | 0 | 0 | 0 | 0 | [1] |
| 9.48 | 2 | 2 | 0 | 0 | 0 | 0 | 0 | 0 | 0 | 0 | [1] | 0 |
| 9.56 | 3 | 1 | [1] | 0 | 0 | 0 | 0 | 0 | 0 | 0 | 0 | 0 |

If bid numbers 1, 2, 3, 4, 7, 8, 9 and 10 had been accepted, it would have generated $580 of additional revenue for the golf course. No other combination of bids could both generate more revenue and also accommodate all of the bidding golfers given the course's capacity constraints.

This result is then provided to the artificial neural network for training the network. Assuming the neural network had not accepted these eight bids, it will use the data from this optimal solution to identify errors and update various weights within the network accordingly. These adjustments will enable the neural network to make better decisions when next presented with the problem to accept or reject a bid.

It should be clear from this example that the subject invention can be used by a golf course to implement a method of doing business that optimizes the revenue generated from the sale of tee times by allowing golfers to submit bids and accepting or rejecting each individual bid in near real time, with confidence that the revenue generated by all accepted bids will be at or near the maximum possible level. By utilizing a bidding business model, such as embodied in the present invention, instead of or in concert with a traditional list price business model, golf courses can optimize the total revenue generated from the sale of tee times.

Figure 3:
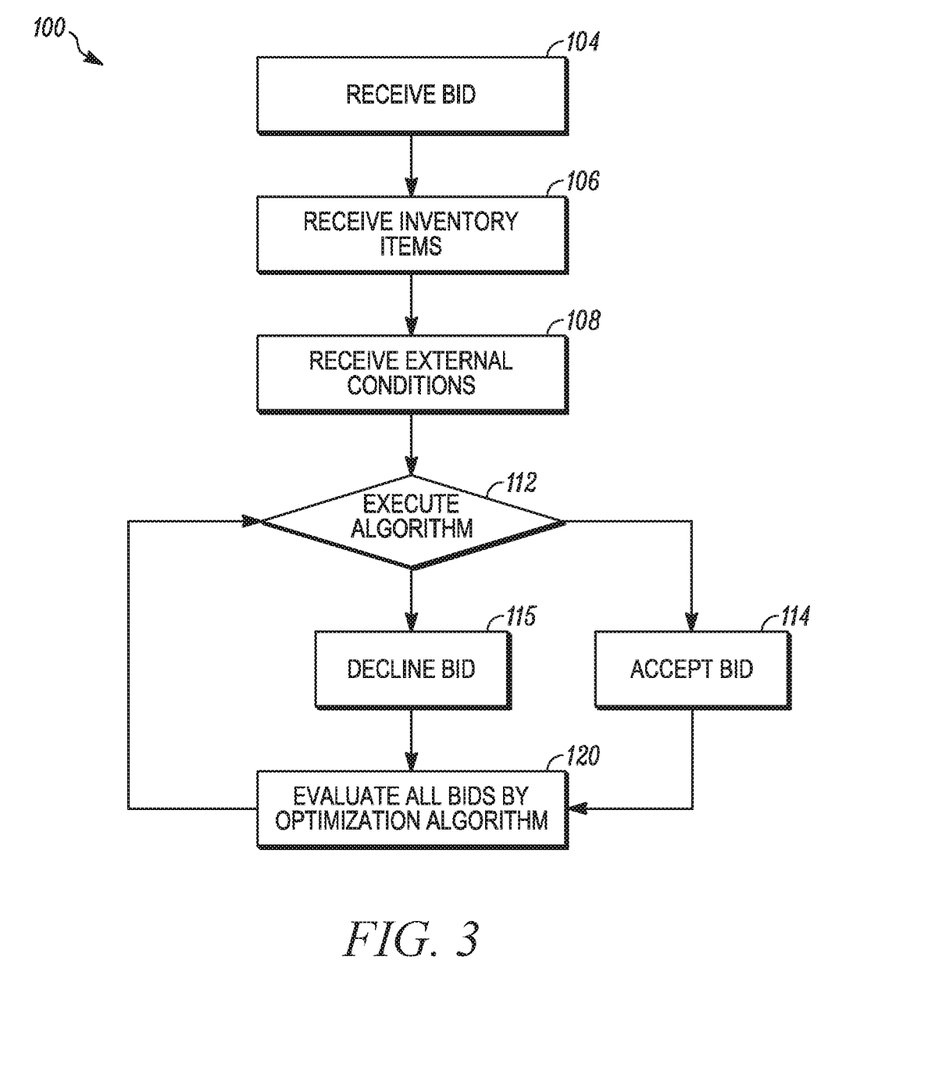
FIG. 3 illustrates a flow chart describing the present invention.

A machine learning algorithm-based method 100 for use in deciding to accept or decline a bid for an inventory item (e.g., a golf tee time) is set forth in FIG. 3. A bid for an inventory item is received at a step 104 and available inventory items (e.g., golf tee times for a golf course application) are received at a step 106. Each bid specifies a time or a time interval for reserving the inventory item and also a bid amount.

The algorithm also takes into account certain external features or conditions that may affect the desirability of (and thus the demand for) the inventory item. These external features are input at a step 108. In the golf tee time application these features may include, among others, expected weather conditions, golf course conditions, etc.

At step 112 the machine learning algorithm executes, using the input information and indicates that the bid should be accepted or declined as shown at respective steps 114 and 115.

On a post hoc basis, all bids submitted (whether accepted or rejected) are evaluated at a step 120. An optimization algorithm, many of which are known by those skilled in the art, receives and evaluates all submitted bids for a given time interval over which the inventory items are consumed. In a golf tee time application, the time interval may be one hour, during which there are typically eight tee times with each tee time able to accommodate four (but not more than four) golfers. The optimization algorithm determines which of the accepted bids should have been rejected in favor of more valuable bids that were received at a later time and also determines which of the rejected bids could have been accepted subject to the capacity constraints of the inventory items. Again, in the golf course tee time application the capacity constraints include eight tee times per hour and no more than four golfers for each tee time.

The output from step 120 (bids that were incorrectly accepted or rejected) is fed back to the machine learning algorithm of step 112. The algorithm uses the "feedback" information to improve operation of the algorithm. Specifically, the weights associated with the algorithm are adjusted such that if the same bids (i.e., the same bids that were evaluated by the optimization algorithm) were again input to the algorithm, the output would be different, i.e., the output would accept certain ones of the bids that had been rejected and reject certain ones of the bids that had been accepted to increase the bid-generated revenue.

A technical solution to optimize revenue by deciding which bids to accept in near real time when subsequent bids for the same inventory item will be submitted later, is non-trivial, and in fact presents a complex problem. While static algorithms may be employed with limited success and predictive accuracy, the use of a computer-based machine learning algorithm (e.g., a neural network as set forth herein) is virtually a necessity to optimize bid-generated revenue by accurately predicting which bids to accept and which to reject in near real time.

The use of machine learning algorithms (such as a neural network) to evaluate bids increases the performance capabilities of a computer by providing faster response times, e.g., response times in near real time. Without the use of machine learning techniques and the training and updating aspects of machine learning algorithms the predictive accuracy of bid evaluation decisions would be woefully inadequate.

In one embodiment of the invention, if there is excess demand for tee times (e.g. all of the tee times 9:00 AM and 10:00 AM on a given Sunday morning have already been sold, but additional bids are received for tee times during that time window) the algorithm is trained to recognize the excess demand and the bidding system may permit a certain number of golfers to be "squeezed-in" at a time between two scheduled tee times, e.g., "squeezed in" between a 9:08 tee time and a 9:16 tee time, when all other close-in-time tee times have been reserved. The present invention can be modified to analyze such "squeezed-in" bids and maximize the revenue generated from any such "squeezed-in" bids by adjusting a reserve price on incoming bids. Thus, in periods of high demand, the algorithm reacts by allowing golfers to bid above the list price to play in their preferred time period. In this embodiment of the invention, the algorithm is trained to predict whether the current bid for a squeeze time is the highest bid that will be received for that tee time.

To accommodate additional golfers and thereby increase course revenue a golf course operator can execute the decision algorithm one or more days in advance. The algorithm will indicate the expected tee times that will not be used (open tee times) during an interval of interest. Instead of awaiting additional bids for those open tee times, the course operator can take a pro-active approach by contacting golfers and inviting them to play during an open tee time. For example, if a threesome is scheduled to play on Tuesday at 9:16, the course operator can contact a golfer who frequently bids to play as a single on weekday mornings and invite him to join the threesome at the price of his most recent bid.

In another embodiment, the course operator can announce the opening to several golfers who may be interested in joining the threesome. The golfers could each be invited to submit a bid, or each told that their last bid would be accepted now and the first one to respond would get the tee time.

Historical information about the utilization of the course and the associated actual price paid for the tee time (either the list price paid or an accepted price resulting from the bidding process) can be used to create demand elasticity models that indicate how demand is affected by varying the list price. The course operator can then adjust the list price to increase demand.

Historical information about the utilization of the course and the associated cost information, typically as determined from accepted bids, can also be used to provide market data to a golf course. Analyzing and parsing this data may provide important marketing information that can be used to target specific demographics. For example, the data may indicate that millennial women value the course (i.e., bid higher amounts) more highly than middle aged men. This information, which is a by-product of the present invention, can then be used to customize or segment marketing campaigns, for example different campaigns for millennial women and middle-aged men.

Collaborative filtering concepts can also be applied to the present invention. Collaborative filtering of data predicts (filtering) the interests of users by collecting preferences from many users (collaborating). The basic premise of collaborative filtering is that if person A has the same opinion as a person B on an issue, A is more likely to share B's opinion on a different issue than the opinion of a randomly chosen person C. In the context of the present invention, if golfers A and B typically bid to play at similar courses, if golfer A has a bid rejected, it is better to offer a recommendation of a course that golfer B plays and likes, rather than a course that a randomly chosen golfer C plays and likes. This increases the probability that golfer A plays a course that both A and B enjoy, and that course sells its available tee times.

In another embodiment the golf course operator or another party collaborating with the operator can reserve one or more tee times in advance. As the tee time approaches the holder of the reserved tee time can sell it, likely at a premium above the list price and above the average accepted bid.

The bid data collected in conjunction with the bidding process can be used as a basis for inviting golfers to play a specific course. For example, a golfer who always submits a higher than average bid to pay a particular course may be identified and invited to play that course or submit a bid to play that course. Specific marketing efforts can also be directed to this golfer. Additionally, the tee times for which the golfer has frequently submitted a bid can be taken into consideration when extending an invitation to the golfer, matching the golfer with his favorite tee time at his favorite course at a price similar or identical to his bid history.

A golfer can send bid messages to a course, the message advising that he is willing to pay a specified dollar amount to play the course anytime during an identified time interval. The bid can be input to the machine learning algorithm several times during that interval until the bid is accepted or until the interval has passed.

Although the invention has been described in the context of reserving golf tee times and maximizing revenue by accepting (or rejecting) tee time bids, the fundamental tenets of the invention can be applied to any industry (lodging, airlines, etc.) where inventory items are perishable, the inventory is capacity constrained, and decisions to accept or reject bids are made in near real time, without the benefit of aggregating a number of bids and comparing them to each other.

Figure 4:
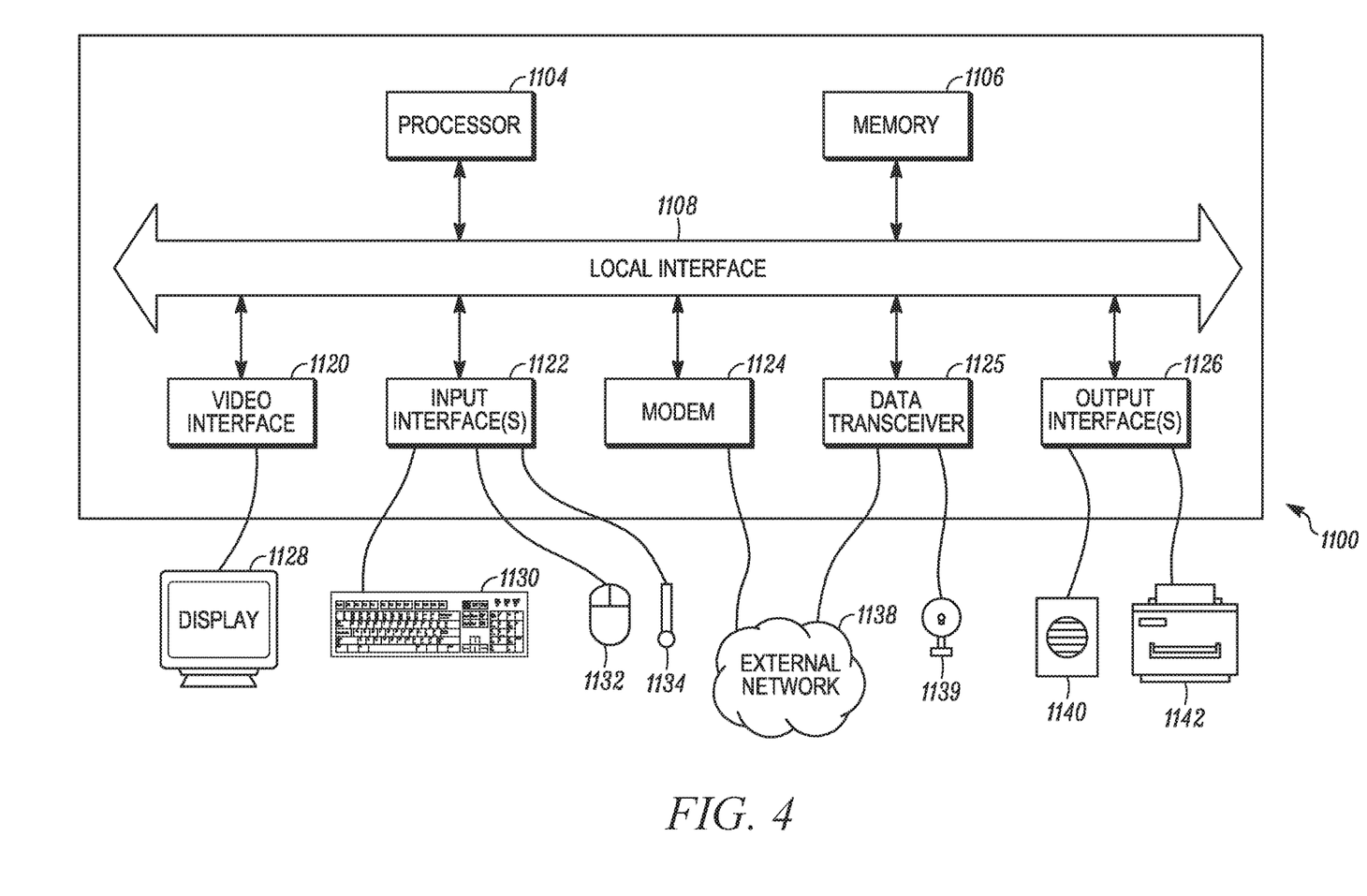
FIG. 4 illustrates an exemplary computer system for practicing the invention.

FIG. 4 illustrates a computer system 1100 for use in practicing the invention. The system 1100 can include multiple remotely-located computers and/or processors and/or servers (not shown). The computer system 1100 comprises one or more processors 1104 for executing instructions in the form of computer code to carry out a specified logic routine that implements the teachings of the present invention. The computer system 1100 further comprises a memory 1106 for storing data, software, logic routine instructions, computer programs, files, operating system instructions, and the like, as is well known in the art. The memory 1106 can comprise several devices, for example, volatile and non-volatile memory components further comprising a random-access memory RAM, a read only memory ROM, hard disks, floppy disks, compact disks including, but not limited to, CD-ROM, DVD-ROM, and CD-RW, tapes, flash drives, cloud storage, and/or other memory components. The system 1100 further comprises associated drives and players for these memory types.

In a multiple computer embodiment, the processor 1104 comprises multiple processors on one or more computer systems linked locally or remotely. According to one embodiment, various tasks associated with the present invention may be segregated so that different tasks can be executed by different computers/processors/servers located locally or remotely relative to each other.

The processor 1104 and the memory 1106 are coupled to a local interface 1108. The local interface 1108 comprises, for example, a data bus with an accompanying control bus, or a network between a processor and/or processors and/or memory or memories. In various embodiments, the computer system 1100 further comprises a video interface 1120, one or more input interfaces 1122, a modem 1124 and/or a data transceiver interface device 1125. The computer system 1100 further comprises an output interface 1126. The system 1100 further comprises a display 1128. The graphical user interface referred to above may be presented on the display 1128. The system 1100 may further comprise several input devices (some which are not shown) including, but not limited to, a keyboard 1130, a mouse 1131, a microphone 1132, a digital camera, smart phone, a wearable device, and a scanner (the latter two not shown). The data transceiver 1125 interfaces with a hard disk drive 1139 where software programs, including software instructions for implementing the present invention are stored.

The modem 1124 and/or data receiver 1125 can be coupled to an external network 1138 enabling the computer system 1100 to send and receive data signals, voice signals, video signals and the like via the external network 1138 as is well known in the art. The system 1100 also comprises output devices coupled to the output interface 1126, such as an audio speaker 1140, a printer 1142, and the like.

This Detailed Description is not to be taken or considered in a limiting sense, and the appended claims, as well as the full range of equivalent embodiments to which such claims are entitled define the scope of various embodiments. This disclosure is intended to cover any and all adaptations, variations, or various embodiments. Combinations of presented embodiments, and other embodiments not specifically described herein by the descriptions, examples, or appended claims, may be apparent to those of skill in the art upon reviewing the above description and are considered part of the current invention.

What is claimed is:

1. A method for evaluating bids for purchasing an inventory item such that a decision to accept or reject a bid optimizes at least one financial or business goal, the method compromising:
    receiving a bid from a natural person, the bid comprising a bid price, the inventory item to be purchased, and a quantity of inventory items to be purchased;
    inputting the bid into a machine learning algorithm that has been trained by;
        re-evaluating a plurality of bids that were received for inventory items:
        determining a first subset of the plurality of bids that should have been accepted to achieve an optimized result relative to the at least one financial or business goal, and a second subset of the plurality of bids that should have been rejected to achieve an optimized result relative to the at least one financial or business goal:
        inputting the first and second subsets into the machine learning algorithm, the algorithm generating an output;
        modifying the machine learning algorithm responsive to the output by calculating a prediction error according to a loss function over one or more iterations and adjusting one or more weight values or other algorithm parameters used to evaluate the bid to reduce the prediction error between the output and the optimized result:
    analyzing the bid using the machine learning algorithm;
    the machine learning algorithm generating an output that informs the decision to accept or reject the bid; and
    advising the natural person that the bid was accepted or rejected.

2. The method of claim 1, wherein the at least one financial or business goal comprises, increasing short-term revenue, increasing long term revenue, retaining customers who submit bids, increasing a number of bids, reducing items in inventory, maximizing short term market share, maximizing long term market share, maximizing a number of inventory items sold in a given period of time, maximizing contribution margin, predicting demand, or a combination of any two or more goal.

3. The method of claim 1, wherein the optimized result relative to the at least one financial or business goal is defined by an objective function for the algorithm, the method further compromising calculating a value of the objective function based on the first and second subsets of bids that were input, and adjusting one or more parameters of the algorithm to reduce the prediction error to thereby minimize, maximize, or optimize the calculated value of the objective function.

4. The method of claim 3, wherein the objective function represents one or more financial or business goals aggregated into a single metric.

5. The method of claim 3, wherein after an initial training, the one or more weight values or other algorithm parameters are updated by inputting bids received after the initial training of the machine learning algorithm.

6. The method of claim 5, further comprising the step of updating the machine learning algorithm to include information as to external factors that may affect the decision to accept or reject a bid.

7. The method of claim 1, wherein the output of the machine learning algorithm is combined with information or data from other sources in order to determine whether to accept or reject the bid.

8. The method of claim 1, wherein the inventory item comprises a capacity-constrained, perishable inventory item.

9. The method of claim 1, wherein the inventory item comprises a product or a service.

10. The method of claim 1, wherein the inventory item comprises a golf tee time reservation, a reservation for an airplane flight, or a reservation for lodging.

11. The method of claim 1, further comprising, a step of informing a bidding party of the decision to accept or reject their bid, wherein the step of informing is executed by a device that receives the decision as an input and contacts the bidding party to advise the decision.

12. The method of claim 1, further comprising the machine learning algorithm receiving information as to external factors that may affect the decision to accept or reject a bid, inputting the information into the machine learning algorithm, and considering the information during the step of analyzing, thereby affecting the output of the machine learning algorithm.

13. A system for evaluating bids for purchasing an inventory item, such that the decision to accept or reject a bid optimizes at least one financial or business goal, the system compromising:
    a computer processor;
    a memory configured with executable instructions operable to:
        receive a bid from a natural person, the bid comprising a bid price, the inventory item to be purchased, and a quantity of inventory items to be purchased;
        input the bid into a machine learning algorithm that has been trained by:
            re-evaluating a plurality of bids that were received for inventory items;
            determining a first subset of the plurality of bids that should have been accepted to achieve an optimized result relative to the at least one financial or business goal, and a second subset of the plurality of bids that should have been rejected to achieve n optimized result relative to the at least one financial or business goal;
            inputting the first and second subsets into the machine learning algorithm, the algorithm generating an output;
            modifying the machine learning algorithm responsive to the optimized result by calculating prediction error according to a loss function over or more iterations and adjusting one or more weight values of other algorithm parameters used to evaluate the bid to reduce the prediction error between the output and the optimized result;
analyze the bid using the machine learning algorithm;
generate an output, from the machine learning algorithm, that informs the decision to accept or reject the bid; and
advise the natural person that the bid was accepted or rejected.

14. The system of claim 13, wherein an instruction to train the machine learning algorithm further comprises instructions to:
determine an objective function for the algorithm;
input bids into the algorithm;
use the algorithm to determine a calculated value of the objective function based on the bids that were input; and
adjust one or more parameters of the algorithm to minimize, maximize, or optimize the calculated value of the objective function.

15. A non-transitory computer readable medium storing executable instructions for evaluating bids for purchasing an inventory item, such that a decision to accept or reject the bid optimizes at least one financial or business goal, the instructions, when executed causing a machine to perform operations comprising:
receiving a bid from a natural person, the bid comprising a bid price, the inventory item to be purchased, and a quantity of inventory items to be purchased;
inputting the bid into a machine learning algorithm that has been trained by;
re-evaluating a plurality of bids that were received for inventory items;
determining a first subset of the plurality of bids that should have been accepted to create an optimized result relative to the at least one financial or business goal, and a second subset rejected to create an optimized result relative to the at least one financial or business goal;
inputting the first and second subsets into the machine learning algorithm, the algorithm generating an output;
modifying the machine learning algorithm responsive to the optimized result by calculating a prediction error according to a loss function over one or more iterations and adjusting one or more weight values or other algorithm parameters used to evaluate the bid to reduce the prediction error between the output and the optimized result;
analyzing the bid using the machine learning algorithm;
the machine learning algorithm generating an output that informs the decision to accept or reject the bid; and
advising the natural person that the bid was accepted or rejected.

16. The non-transitory computer readable storage medium of claim 15, wherein an operation of training the machine learning algorithm further comprises, determining an objective function for the algorithm, inputting bids into the algorithm, using the algorithm to determine a calculated value of the objective function based on the bids that were input, and adjusting one or more parameters of the algorithm to minimize, maximize, or optimize the calculated value of the objective function.

* * * * *